(12) United States Patent
Jayasuriya et al.

(10) Patent No.: US 9,415,823 B2
(45) Date of Patent: Aug. 16, 2016

(54) COLLAPSIBLE BICYCLE

(71) Applicant: Ford Global Technologies, LLC, Dearborn, MI (US)

(72) Inventors: Mangala A. Jayasuriya, Bloomfield Hills, MI (US); James Chih Cheng, Troy, MI (US); Kristin Marie Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 13/956,967

(22) Filed: Aug. 1, 2013

(65) Prior Publication Data

US 2015/0035250 A1 Feb. 5, 2015

(51) Int. Cl.
*B62K 15/00* (2006.01)
*B62H 3/12* (2006.01)

(52) U.S. Cl.
CPC .............. *B62K 15/006* (2013.01); *B62H 3/12* (2013.01); *B62K 15/00* (2013.01); *B62K 2015/001* (2013.01)

(58) Field of Classification Search
CPC .... B62K 15/00; B62K 15/006; B62K 15/008; B62K 2015/001; B62K 2015/005
See application file for complete search history.

(56) References Cited

U.S. PATENT DOCUMENTS

| | | | |
|---|---|---|---|
| 4,237,995 A * | 12/1980 | Pivar | ...................... B60J 5/0487 180/205.4 |
| 4,462,606 A | 7/1984 | Hon | |
| 4,842,292 A | 6/1989 | Wang | |
| 4,911,458 A | 3/1990 | Lin et al. | |
| 5,358,265 A * | 10/1994 | Yaple | ............................. 280/293 |
| 5,899,481 A | 5/1999 | Ferrarin | |
| 6,293,575 B1 | 9/2001 | Burrows et al. | |
| 6,354,618 B1 | 3/2002 | Liao | |
| 6,979,013 B2 | 12/2005 | Chen | |
| 7,264,257 B2 | 9/2007 | Sanders | |
| 7,828,312 B1 | 11/2010 | Yeh | |
| 7,862,065 B2 * | 1/2011 | Hawkins et al. | ........... 280/288.4 |
| 8,123,243 B2 | 2/2012 | Ho | |
| 8,162,345 B1 | 4/2012 | Szu-Yao | |
| 8,177,011 B2 * | 5/2012 | Fletcher | ................. B62K 13/04 180/11 |
| 8,308,178 B2 | 11/2012 | Hoerdum et al. | |

(Continued)

FOREIGN PATENT DOCUMENTS

| | | |
|---|---|---|
| CN | 2825435 Y | 10/2006 |
| EP | 2176117 B1 | 3/2011 |
| GB | 2387147 | 8/2003 |

OTHER PUBLICATIONS

"MORI Folding Bike Concept by Janus Yuan", www.tuvie.com/mori-folding-bike-concept-by-janus-yuan/ (accessed Apr. 11, 2013).

(Continued)

*Primary Examiner* — Joseph Rocca
*Assistant Examiner* — Marc A Scharich
(74) *Attorney, Agent, or Firm* — Frank MacKenzie; Bejin Bieneman PLC

(57) ABSTRACT

A motor vehicle includes a body having an interior which houses a spare wheel of the motor vehicle, a seat and removable headrest of the motor vehicle, and removable accessories stored in the motor vehicle. The removable accessories include at least a collapsible frame and a geared drive mechanism. The frame, the spare wheel, the removable headrest and the drive mechanism can be assembled together to form a bicycle which is separate from the motor vehicle.

10 Claims, 3 Drawing Sheets

(56) References Cited

U.S. PATENT DOCUMENTS

| | | | | |
|---|---|---|---|---|
| 9,061,725 | B1* | 6/2015 | Nania | B62K 3/005 |
| 9,211,932 | B1* | 12/2015 | Huennekens | B62K 13/06 |
| 2003/0070855 | A1* | 4/2003 | Horii | B60P 3/07 |
| | | | | 180/208 |
| 2006/0038378 | A1 | 2/2006 | Lee | |
| 2012/0319377 | A1 | 12/2012 | Sada | |

OTHER PUBLICATIONS

"Nulla Minimalist and Stylish Bike Concept", www.tuvie.com/nulla-minimalist-and-stylish-bike-concept/ (accessed Apr. 11, 2013).

"The Pirate Ninja Eclipse X20 Folding Bike by Tern", www.tuvie.com/the-pirate-ninja-eclipse-x20-folding-bike-by-tern/ (accessed Apr. 11, 2013).

"Urban Collapsible Bicycle by Jochen Laveno Mangesldorff", www.tuvie.com/urban-collapsible-bicycle-by-jochen-laveno-mangesldorff/ (accessed Apr. 11, 2013).

"Ville Folding Bike Doubles as a Shopping Cart", www.tuvie.com/ville-folding-bike-doubles-as-a-shoping-cart/ (accessed Apr. 11, 2013).

"Volkswagen rolls out foldable 'Bik.e' electric bicycle", www.engadget.com/2010/04/29/volkswagen-rolls-out-foldable-bik-e-electric-bicycle-concept/ (Apr. 29, 2010).

"Zigzain hubless BMX concept 3D Model", www.fallingpixel.com/p;roduct.php/13178 (accessed Apr. 11, 2013).

"Apollo E-Bike: Folding Bike Designed for Daily Urban Use", www.tuvie.com/apollo-e-bike-folding-bike-designed-for-daily-urban-use/ (accessed Apr. 11, 2013).

"Bicycle Di Fantastico—The Cycler", www.thecycler.net/concept-bikes/bicycle-di-fantastoco (accessed Apr. 11, 2013).

"Folding Bike Concept by Kilo Estudio", www.tuvie.com/folding-bike-concept-by-kilo-estudio/ (accessed Apr. 11, 2013).

"IziBi Folding Bike by Renato Gschwend", www.tuvie.com/izibi-folding-bike-by-renato-gschwend/ (accessed Apr. 11, 2013).

"Mercedes-Benz High Quality Folding Bike with Shimano 8-Speed Gear and Disk Brakes", www.tuvie.com/mercedes-benz-high-quality-folding-bike-with-shimano-8-speed-gear-and-disk-brakes/ (accessed Apr. 11, 2013).

"Audi Personal Mobility", http://www.behance.net/gallery/Audi-Personal-Mobility/2994339 (Jan. 7, 2012).

"Paris 2010: Smart escooter and ebike roll in", http://green.autoblog.com/2010/09/30/paris-2010-smart-escooter-and-ebike-roll-in/ (Sep. 30, 2010).

"Daimler gets in on the electric bicycle game with Smart E-Bike", http://www.autoblog.com/2011/08/22/daimler-gets-in-on-the-electric-bicycle-game-with-smart-e-bike/ (Aug. 22, 2011).

"G.M. EN-V: Sharpening the Focus of Future Urban Mobility", http://wheels.blogs.nytimes.com/2010/03/24/g-m-en-v-sharpening-the-focus-of-future-urban-mobility (Mar. 24, 2010).

"Roadmap to 2030"; GM Sustainable Urban Mobility Blue Paper, http://media.gm.com/content/dam/Media/documents/CN/ZH/2010/20101105%20GM%20Sustainable%20Urban%20Mobility%20Blue%20Paper.pdf (Nov. 5, 2010).

\* cited by examiner

COLLAPSIBLE BICYCLE

BACKGROUND

Mobility in urban areas becomes increasingly difficult with population growth since increasing the infrastructure to accommodate a larger population can be difficult. For example, adding roads or increasing the size of existing roads to accommodate more passenger vehicles in urban areas can be onerous. Even if more roads were added and/or existing roads expanded, commuters to urban areas may nevertheless encounter increased pollution and parking shortages.

DETAILED DESCRIPTION

An exemplary motor vehicle includes a body that houses a removable frame, a spare wheel, a removable headrest, and a jack. The frame, the spare wheel, the removable headrest, and the jack can be assembled into a bicycle. The bicycle, therefore, includes at least one component that has a dual use in a motor vehicle.

In one possible implementation, the motor vehicle may include a body and a removable and collapsible frame disposed in the vehicle body. A spare wheel for the vehicle is formed from a first wheel removably disposed on a second wheel. A seat is located in the vehicle body and supports a removable headrest that can attach to the frame as a bicycle seat. A jack is disposed in the vehicle body and can apply a linear force when operating in a first mode and a rotational force when operating in a second mode. The jack includes a worm gear assembly that can engage at least a portion of the spare wheel to apply the rotational force to at least one of the first wheel and the second wheel when operating in the second mode. The jack further includes a pedal that can receive a user's foot, and the movement of the pedal about an axis causes the jack to apply the rotational force to at least one of the first wheel and the second wheel. Accordingly, the frame, the spare wheel, the removable headrest, and the jack can be assembled into a bicycle.

Figure 1:
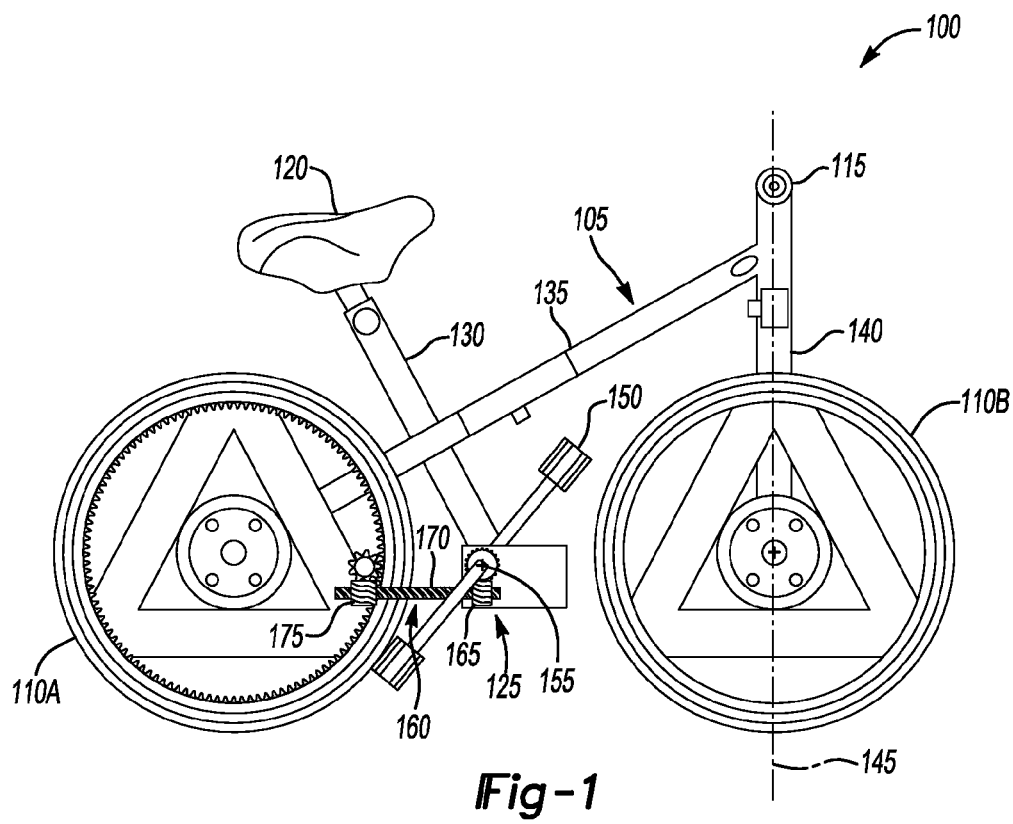
FIG. 1 illustrates an exemplary bicycle assembled from several vehicle components.

FIG. 1 illustrates an exemplary bicycle 100 formed from various vehicle components. The bicycle 100 may take many different forms and include multiple and/or alternate components and facilities. While an exemplary bicycle 100 is shown, the exemplary components illustrated in the Figures are not intended to be limiting. Indeed, additional or alternative components and/or implementations may be used.

As shown in FIG. 1, the bicycle 100 includes a frame 105, wheels 110, handlebars 115, a seat 120, and a drive mechanism 125.

The frame 105 may be configured to structurally support one or more other components of the bicycle 100 such as the wheels 110, the handlebars 115, the seat 120, and the drive mechanism 125. The frame 105 may formed from various materials such as steel, aluminum, titanium, carbon fiber, a thermoplastic, magnesium, scandium, beryllium, bamboo, wood, or any combination of these and possibly other materials with sufficient strength to support the other components of the bicycle 100. The frame 105 may be formed from different pieces, and each piece may have a particular cross-sectional configuration. In the implementation shown in FIG. 1, the frame 105 is formed from various tubes including a seat tube 130, a down tube 135, and a head tube 140. The seat tube 130 may support the seat 120. The down tube 135 may be attached to the rear wheel 110A, the seat tube 130, and the head tube 140. The head tube 140 may support the handlebars 115 and attach to the front wheel 110B. The seat tube 130, the down tube 135, and the head tube 140 may each have a generally cylindrical configuration with a generally circular cross-section.

The wheels 110 may include a rear wheel 110A and a front wheel 110B. The rear wheel 110A may be rotatably mounted to the down tube 135 and may be configured to receive a rotational force from the drive mechanism 125, as described in greater detail below. The rotation of the rear wheel 110A may cause the bicycle 100 to move. The front wheel 110B may be rotatably mounted to the head tube 140, which as discussed above may be connected to the handlebars 115. The head tube 140 may define an axis 145, and rotation of the handlebars 115 about the axis 145 may cause the front wheel 110B to rotate about the axis 145. Thus, the front wheel 110B may be used to steer the bicycle 100. Each wheel 110 may include a rim, a tire, a hub, and spokes. In some instances, the tire may include an inflatable tube. The rear wheel 110A and the front wheel 110B may be combined to form a spare wheel 110 that may be used in a vehicle. That is, the rear wheel 110A and the front wheel 110B may be fixed to one another for use as the spare wheel 110 in a vehicle or separated for use in the bicycle 100.

The handlebars 115 may include any steering mechanism that provides the rider with the necessary leverage to steer the bicycle 100. In some instances, the handlebars 115 may allow the rider to adjust a gear ratio of the drive mechanism 125 or apply brakes (not shown). Additionally, the handlebars 115 may support at least a portion of the rider's weight. Therefore, the handlebars 115 may be formed from a relatively lightweight, stiff material such as an aluminum alloy, steel, carbon fiber, or titanium.

The seat 120 or saddle may be configured to at least partially support the rider while riding the bicycle 100. The seat 120 may be attached to the seat tube 130 when the bicycle 100 is assembled. The seat 120 may include a shell surrounded by a padding material. The shell may be formed from a plastic, such as nylon, or carbon fiber. The padding material may be formed from, e.g., a form or gel. In some instances, the seat 120 may also serve as one of the headrests in the vehicle. When the bicycle 100 is disassembled, the seat 120 of the bicycle 100 may be placed on one of the seats in the vehicle for use as a headrest. Thus, the seat 120 may conform to any regulations concerning vehicle headrests.

The drive mechanism 125 may be configured to apply a rotational force to the wheels 110 of the bicycle 100. The drive mechanism 125 may apply the rotational force to the rear wheel 110A, the front wheel 110B, or both wheels 110. In one possible approach, the drive mechanism 125 may include a pedal assembly with pedals 150 configured to receive each of a rider's feet. The pedals 150 may rotate about an axis 155 according to forces applied to the pedal 150 by the rider. The pedals 150 may be operably connected to a worm gear assembly 160. Thus, as the pedals 150 rotate about the axis 155, a first gear 165 operably connected to the pedals 150 may cause a worm gear 170 to rotate according to the rotation of the pedals 150 about the axis 155. The rotation of the worm gear 170 may cause a second gear 175 to rotate. The second gear 175 may be configured to engage, e.g., the rear wheel 110A, resulting in rotation of the rear wheel 110A in accordance with the rotation of the pedal 150 about the axis 155. Accordingly, the drive mechanism 125 may generate the rotational force commensurate with the rotation of the pedals 150 about the axis 155.

The drive mechanism 125 may be configured to operate in different modes. For instance, in a first mode, the drive mechanism 125 may be configured to apply a linear force. This way, the drive mechanism 125 may act as a jack to, e.g., at least partially lift a vehicle for maintenance such as changing a tire. In a second mode, however, the drive mechanism 125 may be configured to apply the rotational force discussed above to, e.g., the rear wheel 110A of the bicycle 100.

The bicycle 100 illustrated in FIG. 1 includes components that can also be used in a vehicle, such as a car, truck, sport utility vehicle, etc. For example, the rear wheel 110A and the front wheel 110B may be combined to form the spare wheel 110 for the vehicle. The seat 120 may be used as a headrest in the vehicle 180. The drive mechanism 125 may be used as a jack to at least partially lift the vehicle 180 during maintenance. Moreover, the frame 105 may be collapsible so that it may be easily stored in the vehicle 180 when the bicycle 100 is not in use. Additionally, a collapsible frame 105 may allow the rider to conveniently store the bicycle 100 in an ultimate destination such as an office.

Figure 2:
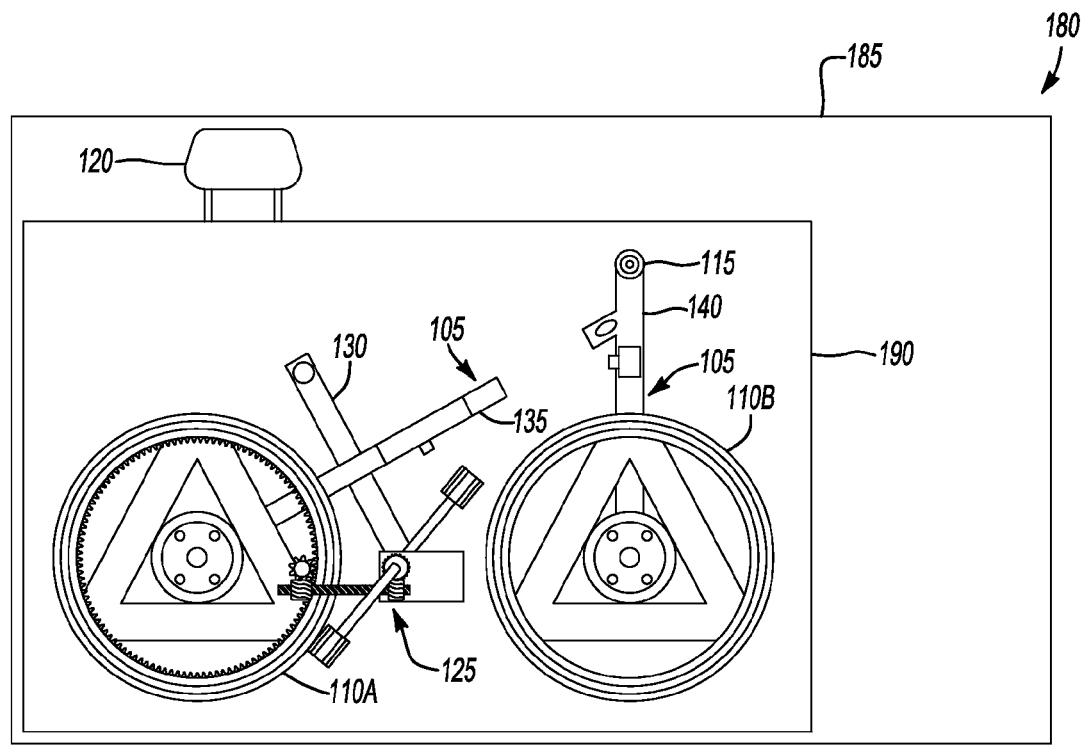
FIG. 2 illustrates one possible arrangement of the disassembled bicycle in a vehicle.

FIG. 2 illustrates an exemplary view of the disassembled bicycle 100 stored in a vehicle 180. The vehicle 180 may include a body 185 defining various portions of the vehicle 180 such as a passenger compartment, a trunk, a cargo compartment, a hatch, or the like, and housing the components of the vehicle 180 and of the bicycle 100. The passenger compartment may include areas of the vehicle 180 where passengers may sit. The passenger compartment may include a driver seat, a passenger seat, and a rear bench seat 190. The components of the bicycle 100 may be stored behind the rear bench seat 190. In some vehicles 180, storing the bicycle 100 behind the rear bench seat 190 may place the bicycle 100 in the trunk. In other vehicles 180, storing the bicycle 100 behind the rear bench seat 190 may put the bicycle 100 in the cargo compartment. Not all components of the bicycle 100 may be stored behind the rear bench seat 190 in the trunk or cargo compartment, however. In some instances, the seat 120 may act as the headrest to one of the seats in the rear bench seat 190 or another seat in the vehicle 180. The rear wheel 110A and the front wheel 110B may be combined and stored in a spare tire well, which may be located in the trunk, cargo compartment, or possibly outside the vehicle 180 such as behind, in front of, or on top of the vehicle 180. The drive mechanism 125 may be stored in the passenger compartment, trunk, or cargo compartment. For instance, the drive mechanism 125 may be stored behind the rear bench seat 190 (as shown in FIG. 2), in the spare tire well, underneath the rear bench seat 190, or any other place in the vehicle 180.

In the exemplary approach illustrated in FIG. 2, the bicycle 100 is shown in two portions. A front portion includes the handlebars 115, the front tube, and the front wheel 110B. The rear portion includes the seat tube 130, the down tube 135, and the rear wheel 110A. The rear portion as shown further includes the drive mechanism 125. The seat 120 of the bicycle 100 is shown as the headrest of one of the seats in the rear bench seat 190. As discussed above, at least some of these components, such as the drive mechanism 125 and wheels 110, of the bicycle 100 may be stored elsewhere in the vehicle 180.

Figure 3:
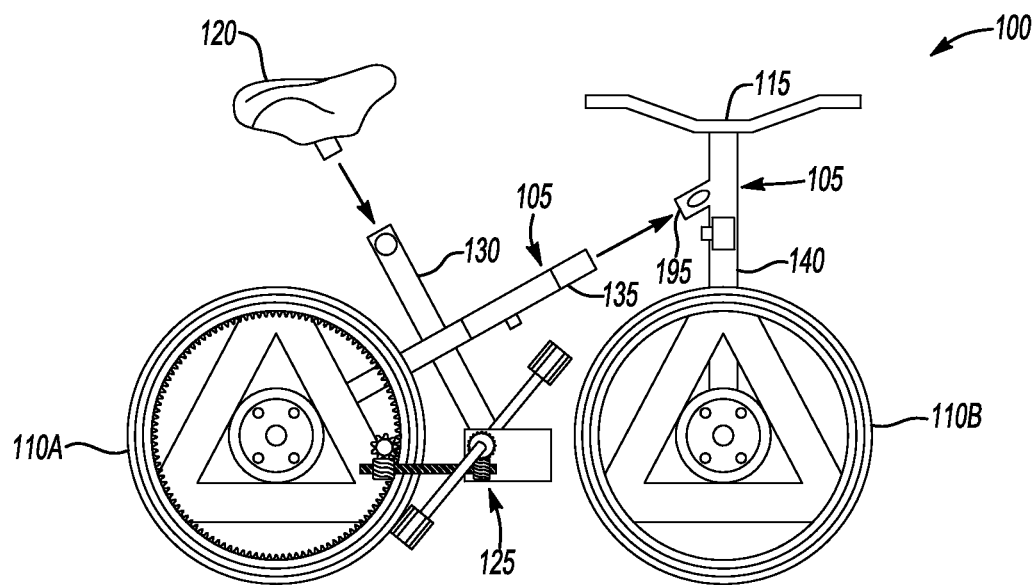
FIG. 3 illustrates an assembly view of the exemplary bicycle.

FIG. 3 illustrates an assembly view of the bicycle 100 shown in FIG. 1. To assemble the bicycle 100, the down tube 135 may be connected to the head tube 140. A connector 195, which may be disposed on or integrally formed with the head tube 140, may be configured to receive the down tube 135. The height of the bicycle 100 may be adjusted by adjusting a length of the down tube 135 and the head tube 140. That is, both the down tube 135 and head tube 140 may have a telescoping configuration to elongate or shorten according to the desires of the rider. Lengthening the down tube 135 and the head tube 140 may make the bicycle 100 longer in width and taller in height. Conversely, shortening the down tube 135 and the head tube 140 may make the bicycle 100 shorter in both length and height. Once the down tube 135 and head tube 140 are connected, the headrest may be removed from one of the seats in the passenger compartment of the vehicle 180 and placed on the seat tube 130 to act as the seat 120 of the bicycle 100. In some instances, the spare wheel 110 may be at least partially disassembled to separate the front wheel 110B and the rear wheel 110A. The front wheel 110B may be attached to the head tube 140 and the rear wheel 110A may be attached to the down tube 135. Furthermore, the jack may be disposed on either the down tube 135 or the seat tube 130 and operably engaged with the rear wheel 110A. As discussed above, the jack may be placed in a mode of operation consistent with generating a rotating force as opposed to a linear force.

Figure 4:
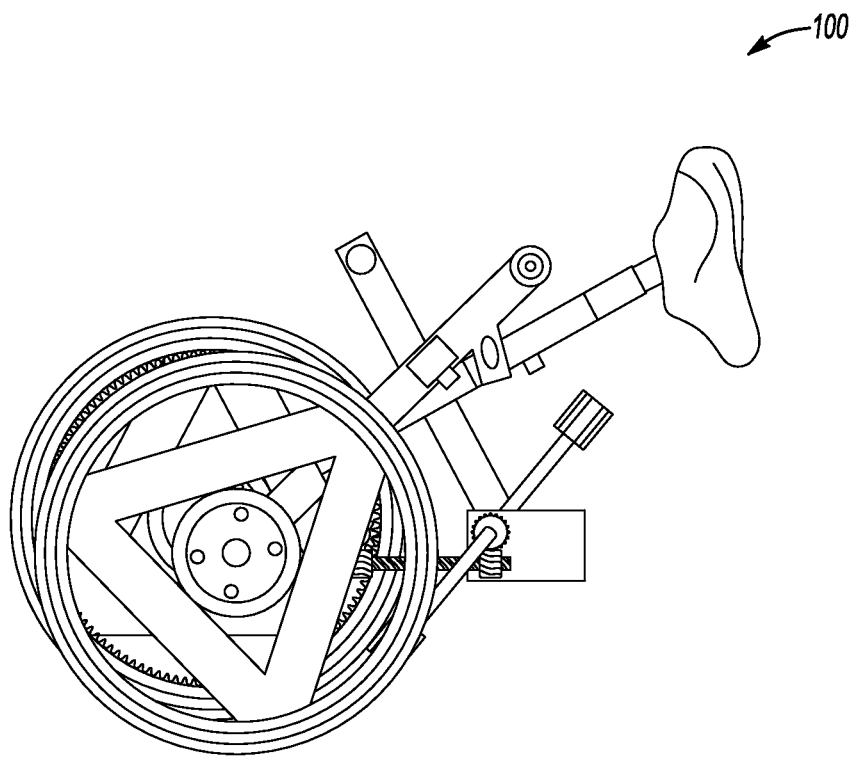
FIG. 4 illustrates a collapsed view of the exemplary bicycle.

FIG. 4 illustrates an exemplary approach where the bicycle 100 may be collapsible, e.g., to make the bicycle 100 easy to carry into a building or other area where riding a bicycle 100 is not typically permitted or desired. The bicycle 100 may be collapsed by removing the down tube 135 from the head tube 140 and removing the seat tube 130 from the down tube 135. The rear wheel 110A and front wheel 110B may be aligned to reduce a footprint of the bicycle 100 and to make the bicycle 100 easier for the rider to carry.

Figures 5A, 5B, 5C:
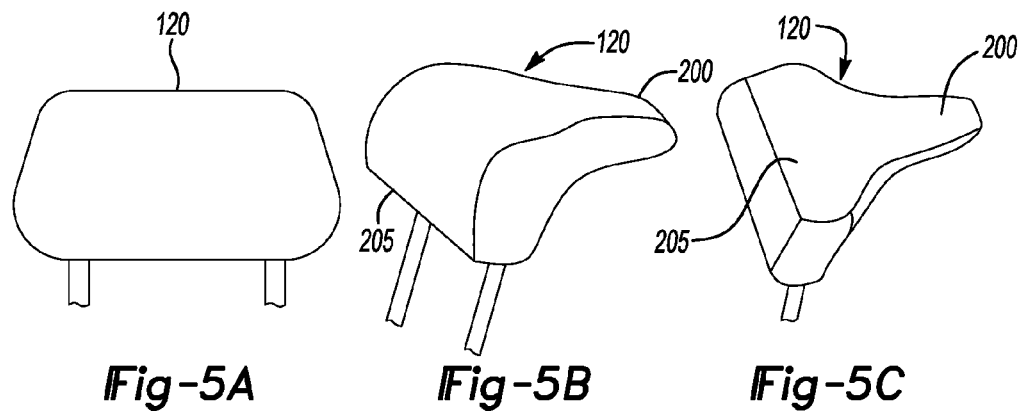
FIGS. 5A-C illustrate different views of an exemplary headrest that may be used as the seat of the bicycle.

FIGS. 5A-C illustrate different views of an exemplary headrest that may be used as the seat 120 of the bicycle 100. FIG. 5A illustrates a front view of the exemplary headrest. The front view includes the surface of the headrest that would contact the back of a passenger's head when the headrest is placed on a seat 120 in the passenger compartment of the vehicle 180. FIGS. 5B and 5C illustrate perspective views of the headrest of FIG. 5A. The nose 200 and support 205 portions of the seat 120 are viewable in FIGS. 5B and 5C.

Figures 6, 7:
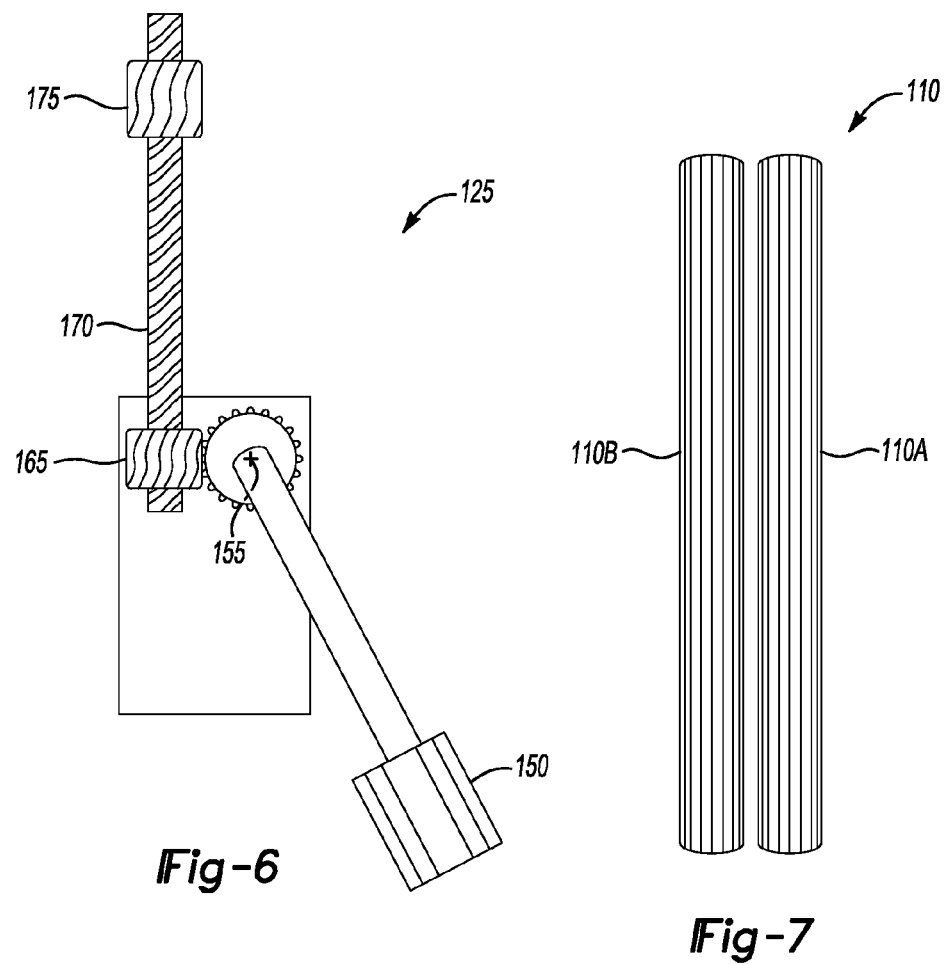
FIG. 6 illustrates an exemplary jack incorporated into the bicycle.
FIG. 7 illustrates an exemplary spare wheel that may be incorporated into the bicycle.

FIG. 6 illustrates an exemplary jack that may serve as the drive mechanism 125 for the bicycle 100. As discussed above, the drive mechanism 125 may include a pedal assembly with pedals 150 configured to receive each of a rider's feet. The pedals 150 may rotate about an axis 155 according to forces applied to the pedal 150 by the rider. The pedals 150 may be operably connected to a worm gear assembly 160. Thus, as the pedals 150 rotate about the axis 155, a first gear 165 may cause a worm gear 170 to rotate. The rotation of the worm gear 170 may cause a second gear 175 to rotate. The second gear 175 may be configured to engage, e.g., the rear wheel 110A, resulting in rotation of the rear wheel 110A in accordance with the rotation of the pedal 150 about the axis 155. Accordingly, the drive mechanism 125 may generate the rotational force commensurate with the rotation of the pedals 150 about the axis 155.

FIG. 7 illustrates an exemplary spare tire that may be used for the wheels 110 of the bicycle 100. As shown, the spare tire includes a rear wheel 110A fixed to a front wheel 110B. When used as the spare tire, the rear wheel 110A and front wheel 110B may remain attached. When used in the bicycle 100, however, the rear wheel 110A may be removed from the front wheel 110B. When the bicycle 100 is assembled, the rear wheel 110A may be connected to the down tube 135 and the front wheel 110B may be connected to the head tube 140.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A motor vehicle comprising:
a body having an interior which houses a spare wheel of the motor vehicle, a seat of the motor vehicle, the seat having a removable headrest, and removable accessories stored in the motor vehicle, wherein the removable accessories include at least a frame and a drive mechanism;
wherein the frame, the spare wheel, the removable headrest and the drive mechanism are configured to be assembled together to form a bicycle which is separate from the motor vehicle.

2. The motor vehicle of claim 1, wherein the drive mechanism is configured to apply a rotational force to at least a portion of the spare wheel when at least the drive mechanism and the spare wheel are assembled together to form the bicycle.

3. The motor vehicle of claim 2, wherein the drive mechanism includes at least a worm gear assembly configured to engage at least a portion of the spare wheel when at least the drive mechanism and the spare wheel are assembled together to form the bicycle.

4. The motor vehicle of claim 2, wherein the drive mechanism includes at least a pedal configured to receive a user's foot, wherein movement of the pedal about an axis causes the drive mechanism to apply the rotational force to the at least a portion of the spare wheel when at least the drive mechanism and the spare wheel are assembled together to form the bicycle.

5. The motor vehicle of claim 1, wherein the spare wheel is formed from a first wheel and a second wheel disposed adjacent to the first wheel.

6. The motor vehicle of claim 5, wherein the first wheel is removable from the second wheel.

7. The motor vehicle of claim 5, wherein at least one of the first wheel and the second wheel is configured to rotate in accordance with a rotational force applied by the drive mechanism when at least the drive mechanism and at least one of the first wheel and the second wheel are assembled together to form the bicycle.

8. The motor vehicle of claim 1, wherein the removable headrest is configured to attach to the frame and function as a bicycle seat when at least the removable headrest and the frame are assembled together to form the bicycle.

9. The motor vehicle of claim 1, wherein the frame includes portions which are collapsible.

10. A motor vehicle comprising:
a body having an interior;
a spare wheel disposed in the interior and formed from a first wheel disposed on a second wheel, wherein the first wheel is removable from the second wheel; and
a seat disposed in the interior and having a removable headrest;
wherein the interior further houses removable accessories stored in the motor vehicle, wherein the removable accessories include at least a frame and a drive mechanism;
wherein the frame, the spare wheel, the removable headrest and the drive mechanism are configured to be assembled together to form a bicycle which is separate from the motor vehicle.

* * * * *